(12) United States Patent
Ogino et al.

(10) Patent No.: US 10,587,819 B2
(45) Date of Patent: Mar. 10, 2020

(54) VIDEO DISPLAY SYSTEM, VIDEO DISPLAY DEVICE, AND VIDEO DISPLAY METHOD

(71) Applicant: PANASONIC INTELLECTUAL PROPERTY MANAGEMENT CO., LTD., Osaka (JP)

(72) Inventors: Ryoji Ogino, Kanagawa (JP); Junya Kuwada, Kanagawa (JP); Hiroyasu Makino, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/033,668

(22) Filed: Jul. 12, 2018

(65) Prior Publication Data
US 2018/0324361 A1 Nov. 8, 2018

Related U.S. Application Data

(63) Continuation of application No. 15/182,850, filed on Jun. 15, 2016, now Pat. No. 10,049,608.

(30) Foreign Application Priority Data

Jul. 14, 2015 (JP) .................................. 2015-140864

(51) Int. Cl.
*G06F 1/16* (2006.01)
*G06F 3/147* (2006.01)
(Continued)

(52) U.S. Cl.
CPC ............. *H04N 5/247* (2013.01); *G06F 1/163* (2013.01); *G06F 3/147* (2013.01); *G09G 3/2003* (2013.01);
(Continued)

(58) Field of Classification Search
CPC .......... G09G 3/2003; G09G 5/08; G09G 5/10; G09G 5/14; G09G 5/34–346;
(Continued)

(56) References Cited

U.S. PATENT DOCUMENTS 6,249,311 B1 * 6/2001 Rouse, Jr. .......... H04N 5/23209
348/164
2004/0119877 A1 * 6/2004 Shinozaki .............. H04N 5/235
348/362
(Continued)

FOREIGN PATENT DOCUMENTS

JP 05-127608 5/1993
JP 07-294876 11/1995
(Continued)

OTHER PUBLICATIONS

Fumio Okura et al: "Displaying Spherical Aerial HDR Images for Telepresense System (Partial English Translation)", Technical Report of IEICE. The Institute of Electronics, Information and Communication Engineers, published on Sep. 20, 2012, vol. 112 No. 221.

*Primary Examiner* — Nathan Danielsen
(74) *Attorney, Agent, or Firm* — Greenblum & Bernstein, P.L.C.

(57) ABSTRACT

A video image processing device uses a plurality of video data captured by a plurality of cameras to generate a wide range video data of the entire celestial sphere having a 360-degree range around an area where the plurality of cameras is installed and to transmit the generated wide range video data of the entire celestial sphere to a video display device. The video display device detects a direction of the video display device as a direction of a sight line of the user, receives the transmitted wide range video data of the entire celestial sphere, segments a predetermined area of video data including a detection result of a sensor from the wide range video data of the entire celestial sphere, adjusts a (Continued)

luminosity of the extracted predetermined area of video data to fall in a certain range of luminosity, and displays the adjusted predetermined area of video data.

5 Claims, 10 Drawing Sheets (51) Int. Cl.
*H04N 5/247* (2006.01)
*H04N 5/225* (2006.01)
*H04N 5/232* (2006.01)
*G09G 3/20* (2006.01)

(52) U.S. Cl.
CPC ....... *H04N 5/2258* (2013.01); *H04N 5/23238* (2013.01)

(58) Field of Classification Search
CPC ... G09G 5/37–5/377; G09G 2320/0626–0653; G09G 2320/068; G09G 2340/10–145; G09G 2354/00; G06F 1/163; G06F 1/1637; G06F 3/011–013; G02B 27/017; G02B 27/0172; G02B 27/0176; G02B 2027/0118; G02B 2027/0174; G02B 2027/0178; H04N 5/2258; H04N 5/2259; H04N 5/23238; H04N 5/247; H04N 5/66; H04N 5/3415; H04N 5/265; H04N 5/235; H04N 2013/0074–0092; G06T 7/408; G06T 7/0085; G06T 5/006; G06T 2200/32; G06T 2207/20024; G06T 2207/20221; G06T 2207/30168

See application file for complete search history.

(56) References Cited

U.S. PATENT DOCUMENTS

| | | | |
|---|---|---|---|
| 2011/0262039 A1* | 10/2011 | Du | G06K 9/00228 382/167 |
| 2012/0139968 A1* | 6/2012 | Adachi | G09G 3/3426 345/690 |
| 2014/0064554 A1* | 3/2014 | Coulter | G06K 9/3216 382/103 |
| 2015/0206347 A1* | 7/2015 | Russell | H04N 5/23293 348/360 |
| 2015/0264259 A1* | 9/2015 | Raghoebardajal | G06T 3/0062 348/36 |
| 2015/0293362 A1 | 10/2015 | Takahashi et al. | |
| 2016/0012855 A1* | 1/2016 | Krishnan | G11B 27/105 386/241 |

FOREIGN PATENT DOCUMENTS

| | | |
|---|---|---|
| JP | 2003-284019 A | 10/2003 |
| JP | 2015-004948 | 1/2015 |
| WO | 2014/077046 A1 | 5/2014 |
| WO | 2015/072997 | 5/2015 |

* cited by examiner

VIDEO DISPLAY SYSTEM, VIDEO DISPLAY DEVICE, AND VIDEO DISPLAY METHOD

CROSS REFERENCE TO RELATED APPLICATIONS

This is a continuation application of U.S. patent application Ser. No. 15/182,850, filed Jun. 15, 2016, which claims the benefit of Japanese Patent Application No. 2015-140864, filed Jul. 14, 2015. The entire disclosure of each of the above-identified applications, including the specification, drawings, and claims, is incorporated herein by reference in its entirety.

BACKGROUND

1. Technical Field

The present disclosure relates to a video display system, a video display device, and a video display method for displaying video data that is captured from directions in the entire celestial sphere.

2. Description of the Related Art

A camera (hereinafter, referred to as an omnidirectional camera) that can capture a video image from directions in the entire celestial sphere (that is, in the 360-degree range) has started to emerge in recent years. Since the omnidirectional camera can capture a wide range video image, capturing is mostly performed in an outdoor environment considering the assumed use thereof. In the outdoor environment, however, a video image captured in the same direction as sunlight and a video image captured in the opposite direction to sunlight coexist in a 360-degree range video image, and the luminosity of the captured video image is rendered non-uniform according to an azimuth. Thus, an approach to increase the dynamic range of a camera that captures a video image in the opposite direction to sunlight (that is, a video image having a low luminosity) is taken into consideration.

In order to effectively use the dynamic range of the camera upon capturing an image, Japanese Patent Unexamined Publication No. 7-294876, for example, is known as a preceding technology for displaying an image captured by the camera in a separate display device (for example, a head mounted type display).

In the display device disclosed in Japanese Patent Unexamined Publication No. 7-294876, for example, is known as a preceding technology for displaying an image captured by the camera in a separate display device (for example, a head mounted type display).

In the display device disclosed in Japanese Patent Unexamined Publication No. 7-294876, usually, a plurality of displays of liquid crystal displays (LCDs) is irradiated by a main backlight. An image signal upon capturing and a measured light information signal are input into a controller of the display device. The controller performs control of each drive circuit based on the measured light information to drive a plurality of auxiliary backlights, a plurality of auxiliary flashes and a plurality of auxiliary lamps to emit light, and the plurality of LCDs is irradiated in an auxiliary manner. Accordingly, a sense of realism produced by a change in the luminosity of a photogenic subject upon capturing is not damaged.

There is known a stereo camera that includes two capturers fixed in one casing in such a manner to capture the same photogenic subject by using left and right capturers. The stereo camera captures a photogenic subject from a plurality of different directions and records planar direction information and depth direction information (three-dimensional information).

However, in a case where a user sees the video image captured by the omnidirectional camera using the head mounted type display (for example, a head mounted display; HMD), the video image is not clearly displayed even if a dark video image such as a video image captured in the opposite direction to sunlight is illuminated by a backlight.

In a case, for example, where the user wearing the head mounted display sees the video image captured by the omnidirectional camera, the head mounted display, in accordance with a motion of the user, displays the video image by switching between various directions of the directions in the entire celestial sphere in a short amount of time. Thus, if the luminosity of the video image is different according to a direction in which the user watches, illuminating the video image uniformly at the same luminosity does not improve the visibility of the video image.

SUMMARY

An object of the present disclosure is to improve, when a video image captured by an omnidirectional camera is seen by using a head mounted display, the visibility of the video image by dynamically adjusting the luminosity of the video image in accordance with the direction of the video display device as the direction of the sight line of a user and increasing a dynamic range upon capturing in a pseudo manner.

According to an aspect of the present disclosure, there is provided a video display system including a video image processing device that processes a plurality of video data captured by a plurality of cameras and is connected to the video display system, and a video display device that is wearable by a user and is connected to the video display system, in which the video image processing device includes a video generator that uses the plurality of video data to generate a wide range video data of the entire celestial sphere having a 360-degree range around an area where the plurality of cameras is installed, and a video transmitter that transmits the wide range video data of the entire celestial sphere generated by the video generator to the video display device, and the video display device includes a sensor that detects a direction of a sight line of the user, a video receiver that receives the wide range video data of the entire celestial sphere transmitted from the video transmitter, a video extractor that segments a predetermined area of video data including a detection result of the sensor from the wide range video data of the entire celestial sphere, a luminosity adjuster that adjusts a luminosity of the predetermined area of video data extracted by the video extractor to fall in a certain range of luminosity corresponding to a luminosity of the wide range video data of the entire celestial sphere, and a video display that displays the predetermined area of video data adjusted by the luminosity adjuster.

According to another aspect of the present disclosure, there is provided a video display device wearable by a user and connected with a video image processing device that processes a plurality of video data captured by a plurality of cameras, the video display device including a sensor that detects a direction of a sight line of the user, a video receiver that receives a wide range video data of the entire celestial sphere generated by the video image processing device and having a 360-degree range around an area where the plurality of cameras is installed, a video extractor that segments a predetermined area of video data including a detection result of the sensor from the wide range video data of the entire celestial sphere, a luminosity adjuster that adjusts a luminosity of the predetermined area of video data extracted by the video extractor to fall in a certain range of luminosity corresponding to a luminosity of the wide range video data of the entire celestial sphere, and a video display that displays the predetermined area of video data adjusted by the luminosity adjuster.

According to still another aspect of the present disclosure, there is provided a video display method for a video display device wearable by a user and connected with a video image processing device that processes a plurality of video data captured by a plurality of cameras, the method including detecting a direction of a sight line of the user, receiving a wide range video data of the entire celestial sphere generated by the video image processing device and having a 360-degree range around an area where the plurality of cameras is installed, segmenting a predetermined area of video data including the detected direction of the sight line of the user from the wide range video data of the entire celestial sphere, adjusting a luminosity of the extracted predetermined area of video data to fall in a certain range of luminosity corresponding to a luminosity of the wide range video data of the entire celestial sphere, and displaying the adjusted predetermined area of video data.

According to the present disclosure, when a video image captured by an omnidirectional camera is seen by using a head mounted display, the luminosity of the video image is dynamically adjusted in accordance with the direction of the video display device. Thus, a dynamic range upon capturing can be increased in a pseudo manner, and the visibility of the video image can be improved.

DETAILED DESCRIPTION

Hereinafter, an embodiment (hereinafter, referred to as the present embodiment) in which a video display system, a video display device, and a video display method according to the present disclosure are specifically disclosed will be described in detail with appropriate reference to the drawings. However, excessively detailed descriptions may not be provided. For example, detailed descriptions of previously well-known matters and duplicate descriptions of substantially the same configurations may not be provided. The purpose of this is to avoid the following descriptions becoming unnecessarily redundant and to facilitate understanding thereof for those skilled in the art. The appended drawings and the following descriptions are provided in order to allow those skilled in the art to sufficiently understand the present disclosure and are not intended to limit the subject matter disclosed in the claims.

Omnidirectional camera system 1, as an example of a video display system of the present embodiment, for example, uses video data of video images captured by a plurality of cameras CAM1 to CAM7 installed in either an indoor environment or an outdoor environment to generate video data having a 360-degree range around the area where the plurality of cameras CAM1 to CAM7 is installed and to segment and display video data captured in the direction of head mounted display 4 (video display device) that the user wears as the direction of the sight line of a user (hereinafter referred to as "the direction of the sight line of a user").

Figure 1:
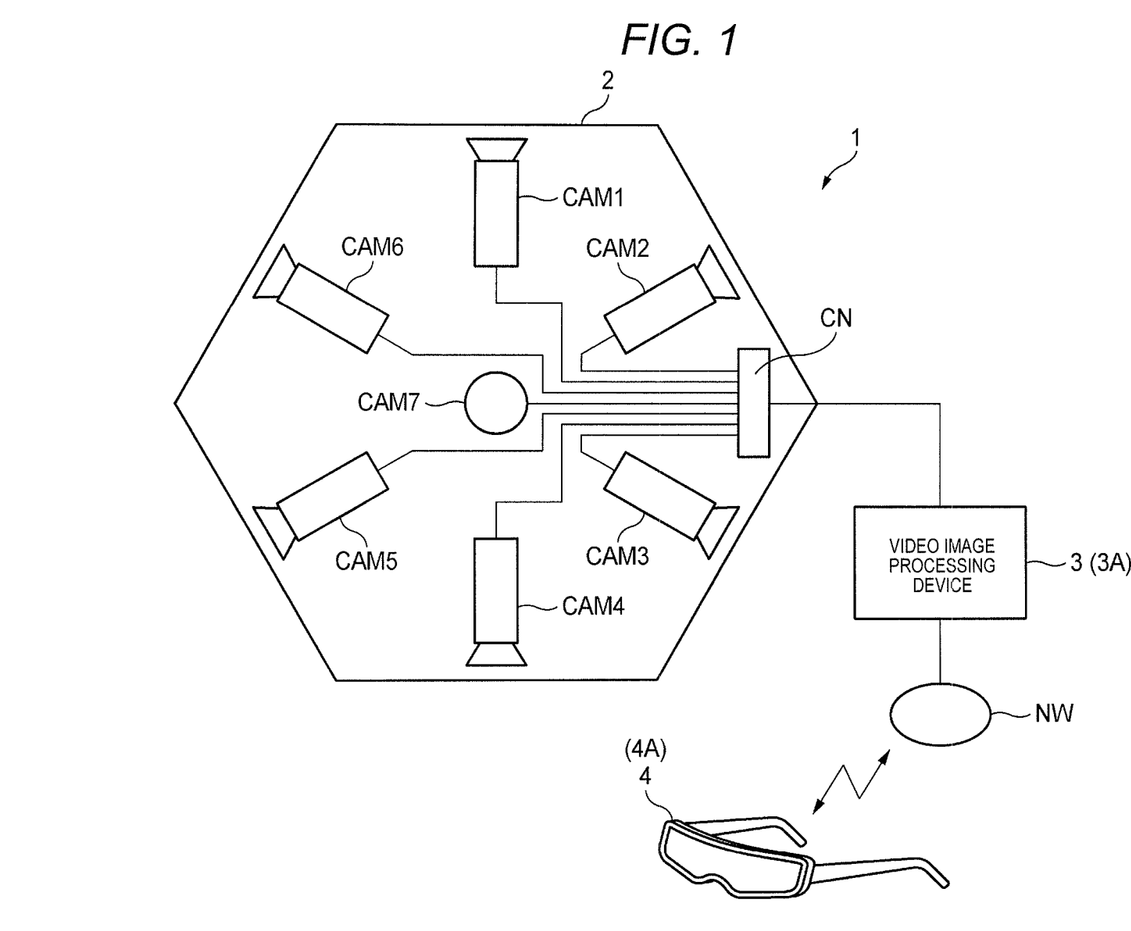
FIG. 1 is a schematic diagram of a schematic configuration example of a stereo camera system in a first embodiment and is a diagram of an example of a system configuration of an omnidirectional camera system in the present embodiment.
Figure 2:
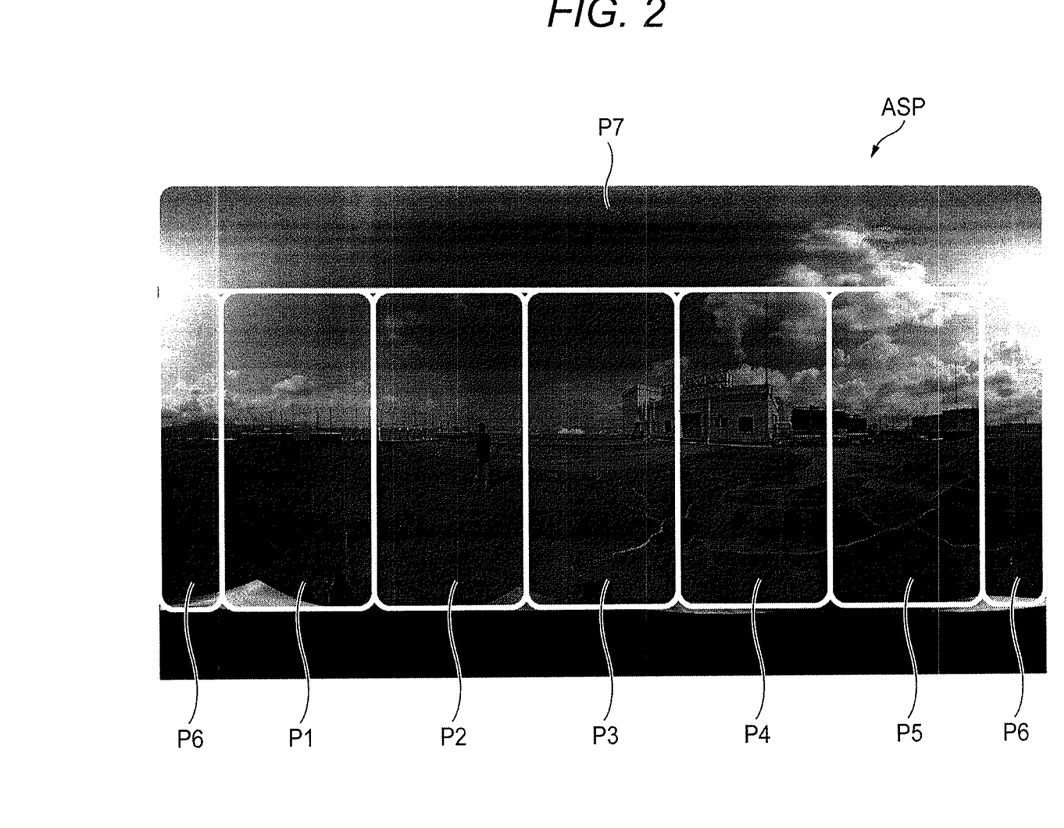
FIG. 2 is a diagram of an example of a wide range video data of the entire celestial sphere obtained by stitching images captured by all cameras illustrated in FIG. 1.

FIG. 1 is a diagram illustrating an example of a system configuration of omnidirectional camera system 1 of the present embodiment. FIG. 2 is a diagram illustrating an example of wide range video data of the entire celestial sphere ASP obtained by performing a stitching process for images captured by all of cameras CAM1 to CAM7 illustrated in FIG. 1. As illustrated in FIG. 1, omnidirectional camera system 1 is configured to include omnidirectional camera 2 that is a camera unit which includes cameras CAM1 to CAM7 generating data of captured images (for example, moving images) for the stitching process, video image processing device 3 that sequentially generates wide range video data of the entire celestial sphere ASP by performing the stitching process for the data of each captured image, and head mounted display 4 that segments a predetermined area of video data from wide range video data of the entire celestial sphere ASP transmitted from video image processing device 3 and displays the segmented video data.

Each of cameras CAM1 to CAM7 includes a capturer that can be configured of a lens having a wide angle of view (for example, 120 degrees) and an image sensor. Each of cameras CAM1 to CAM7 uses data (that is, an electrical signal of an image) obtained from the capturer to generate and store image data in red-green-blue (RGB) format that can be recognized by a human being or image data in YUV (luminance and chrominance) format. Cameras CAM1 to CAM7 can be configured by using a known technology, and detailed descriptions of the internal configurations thereof will not be provided.

While the omnidirectional camera is configured of seven cameras CAM1 to CAM7 in FIG. 1, the number of cameras is not limited to seven. Cameras CAM1 to CAM6 are arranged at equal intervals in a circumferential direction in such a manner that optical axes thereof radiate in approximately horizontal directions. Camera CAM7 is disposed to have an optical axis directed upwardly in an approximately vertical direction in order to perform capturing in the direction of the zenith. Cameras CAM1 to CAM7 are arranged in such a manner that areas captured by two adjacent cameras of CAM1 to CAM7 partially overlap with each other. In omnidirectional camera system 1, the arrangement of the cameras generating data of the captured images for the stitching process is not limited to the arrangement illustrated in FIG. 1 and may be variously changed. For example, camera CAM7 may be omitted.

Video image processing device 3 is configured by using a personal computer (PC) that is connected to cameras CAM1 to CAM7 in a wired manner through connector CN. However, the connection between video image processing device 3 and cameras CAM1 to CAM7 is not limited to wired connection and may be wireless connection. Video image processing device 3, though a detailed configuration thereof will be described later with reference to FIG. 3 and FIG. 5, has a hardware configuration including a central processing unit (CPU) that generally performs various control processes based on a predetermined control program, a random access memory (RAM) that functions as a work area and the like of the CPU, a read-only memory (ROM) that stores the control program executed by the CPU and data, a loudspeaker, an input device, a hard disk drive (HDD), and the like.

At least a part of various functions (the stitching process, an average luminosity per azimuth information superimposition process, and the like described in detail later) performed in video image processing device 3 can be realized by the CPU executing dedicated control programs (a stitching process program, an average luminosity per azimuth information superimposition process program, and the like). Video image processing device 3 is not limited to a PC, and other information processing devices (for example, a server, a smartphone, a tablet terminal, and the like) that exhibit the same function can also be used. At least a part of the function of video image processing device 3 may be replaced by a process performed by other known hardware.

In video image processing device 3, as illustrated in FIG. 2, a process (that is, the stitching process) that composites captured images (seven video images) captured by cameras CAM1 to CAM7 to generate one panorama composite image, wide range video data of the entire celestial sphere ASP, is performed for each frame. As illustrated in FIG. 2, video data P1 to P7 that are data of the captured images are respectively data captured by cameras CAM1 to CAM7. Wide range video data of the entire celestial sphere ASP illustrated in FIG. 2 is data that is obtained by capturing performed by omnidirectional camera 2 installed in an outdoor environment (for example, on the ground). Camera CAM7 performs capturing in the direction of the zenith, and thus, the state of the sky is represented in wide range video data of the entire celestial sphere ASP. Other cameras CAM1 to CAM6 perform capturing in the horizontal direction, and thus, the state of the ground in the horizontal direction is represented therein. Wide range video data of the entire celestial sphere ASP allows clear determination of the state of affairs in the 360-degree range around the place where omnidirectional camera 2 is installed (the ground in the example illustrated in FIG. 2).

Video image processing device 3 transmits wide range video data of the entire celestial sphere ASP of each frame to head mounted display 4 through network NW. Network NW may be a network that uses wired communication or may be a network that uses wireless communication (for example, a wireless local area network (LAN)).

Head mounted display 4 is used as being mounted in a state where parts of a casing frame that extend left and right as a pair, such as glasses, are hung near the ears of the user. In other words, head mounted display 4 is used in a state mounted on the user. Head mounted display 4 is connected to video image processing device 3 through network NW. Head mounted display 4, though a detailed configuration thereof will be described later with reference to FIG. 4 and FIG. 6, receives wide range video data of the entire celestial sphere ASP transmitted from video image processing device 3, segments a predetermined area of video data including the direction of the sight line of the user (that is, the direction in which a video data display surface in the casing frame of head mounted display 4 faces the user) as a center direction, and displays the segmented video data in a real-time manner. Video image processing device 3, instead of or at the same time as displaying video data in head mounted display 4, may sequentially store wide range video data of the entire celestial sphere ASP after the stitching process in a known storage device (not illustrated) such as an HDD.

Figure 3:
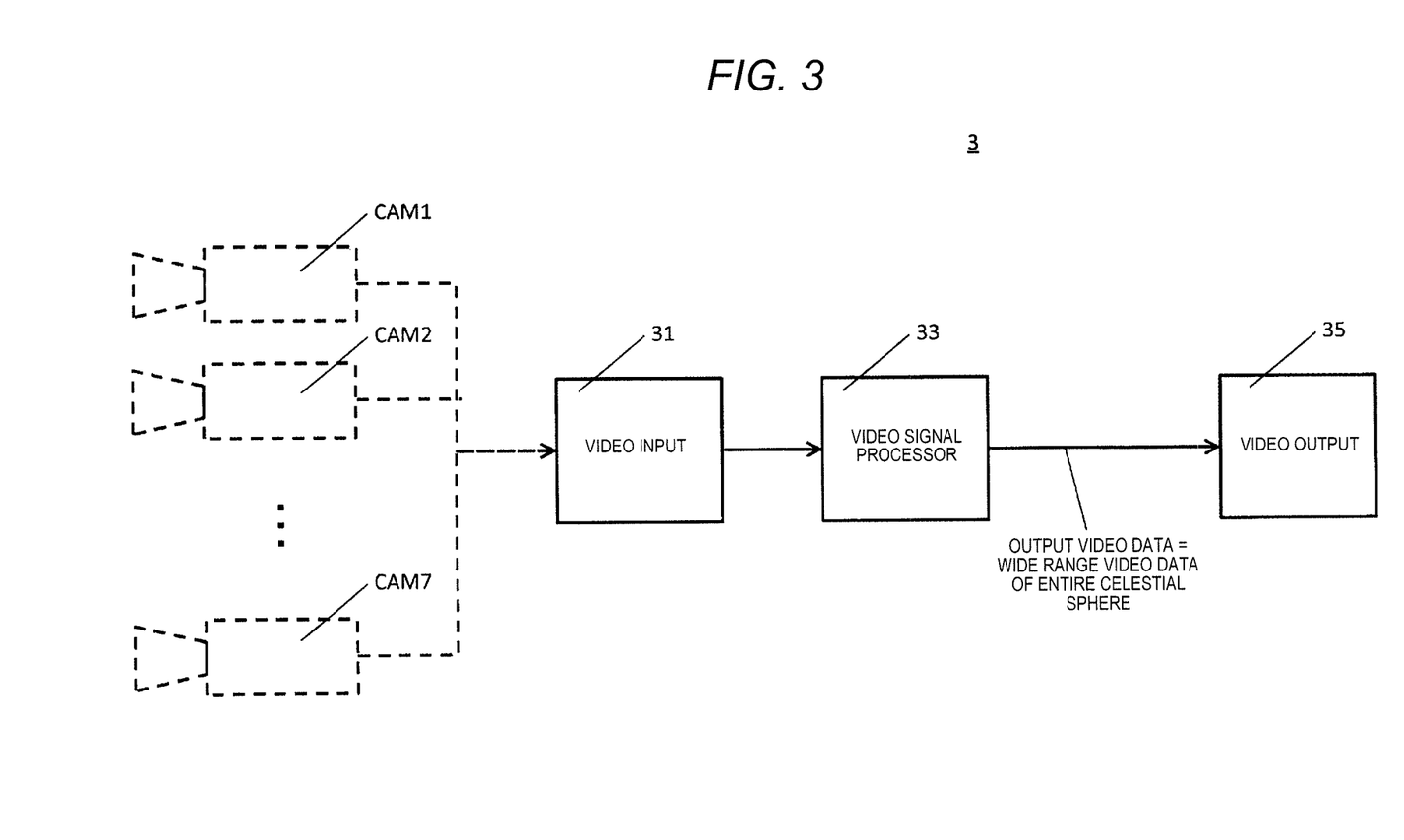
FIG. 3 is a block diagram of a first example of an internal configuration of a video image processing device of the present embodiment.

FIG. 3 is a block diagram illustrating a first example of an internal configuration of the video image processing device of the present embodiment. Video image processing device 3 illustrated in FIG. 3 is configured to include at least video input 31, video signal processor 33, and video output 35. In FIG. 3, connector CN (refer to FIG. 1) is not illustrated between cameras CAM1 to CAM7 and video input 31.

Video input 31 functions as an input-output interface for cameras CAM1 to CAM7 and obtains, as input, video data output from each of cameras CAM1 to CAM7 through connector CN. Video input 31 outputs video data from each of cameras CAM1 to CAM7 to video signal processor 33.

Video signal processor 33 as an example of a video generator is configured by using a processor such as a CPU, a micro processing unit (MPU), or a digital signal processor (DSP) and generates wide range video data of the entire celestial sphere ASP, which is the panorama video data illustrated in FIG. 2, by performing the stitching process for each frame of video data using video data that is the image data captured by cameras CAM1 to CAM7 and output from video input 31. In wide range video data of the entire celestial sphere ASP, luminosity data per azimuth of the frames of the video data is included for each pixel constituting wide range video data of the entire celestial sphere ASP, and the same applies hereinafter. The luminosity data, for example, is a luminance value for each pixel in a case where the video data is data in YUV format and is a pixel value in a case where the video data is data in RGB format.

Video signal processor 33 stores wide range video data of the entire celestial sphere ASP in a memory not illustrated (for example, a flash memory or an HDD). Video signal processor 33 outputs wide range video data of the entire celestial sphere ASP to video output 35.

Video output 35 as an example of a video transmitter functions as a communication interface for head mounted display 4 and transmits wide range video data of the entire celestial sphere ASP output from video signal processor 33 to head mounted display 4 through network NW. Video output 35 may display the wide range video data of the entire celestial sphere in a display device (not illustrated) different from head mounted display 4.

Figure 4:
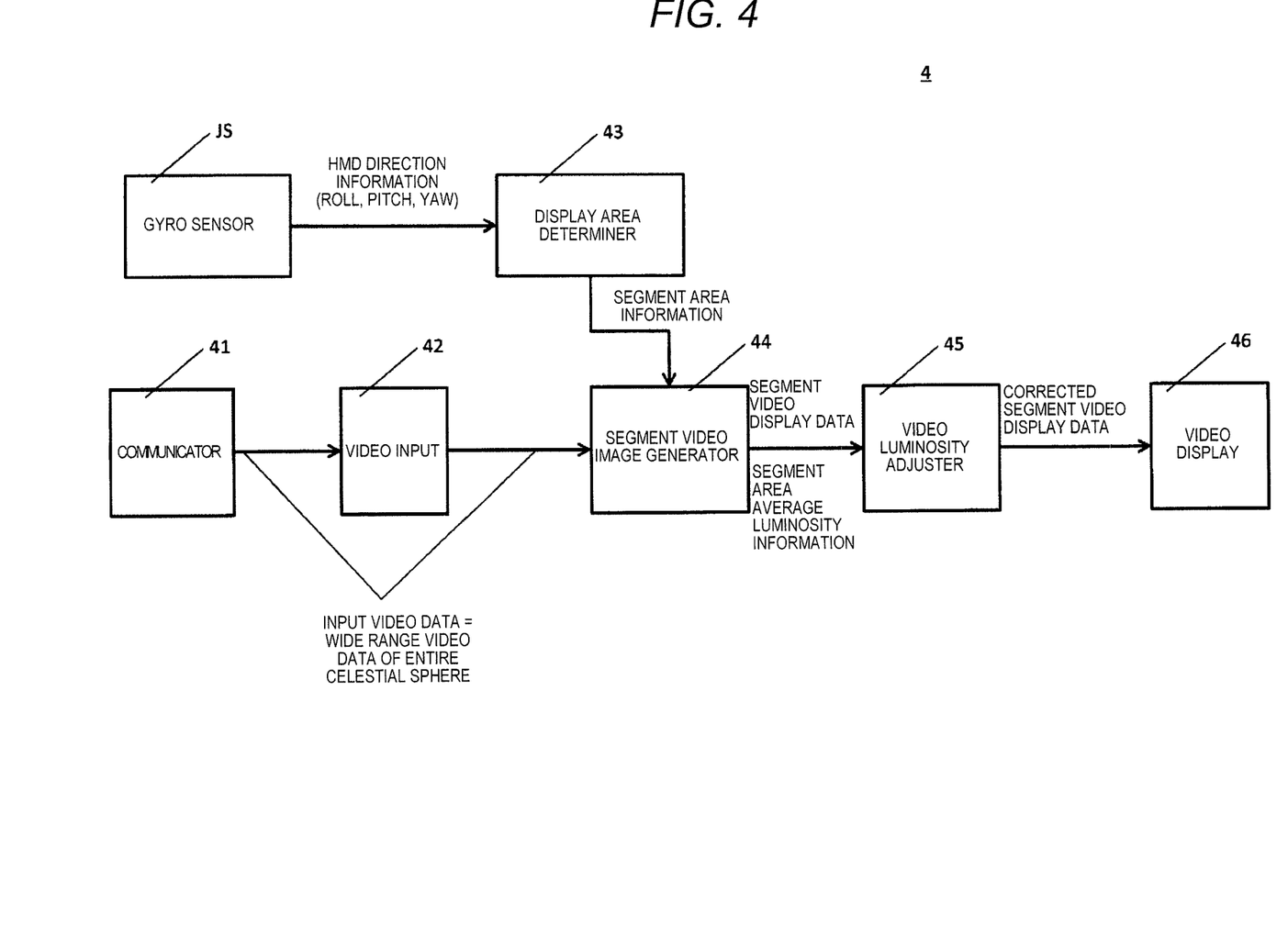
FIG. 4 is a block diagram of a first example of an internal configuration of a head mounted display of the present embodiment.

FIG. 4 is a block diagram illustrating a first example of an internal configuration of the head mounted display of the present embodiment. Head mounted display 4 illustrated in FIG. 4 is configured to include at least gyro sensor JS, communicator 41, video input 42, display area determiner 43, segment video image generator 44, video luminosity adjuster 45, and video display 46.

Gyro sensor JS as an example of a sensor detects the angle of the direction of the sight line of the user wearing head mounted display 4 (that is, the direction in which the video data display surface in the casing frame of head mounted display 4 faces the user). Gyro sensor JS outputs a detection result (that is, detected values corresponding to three axes of roll, pitch, and yaw) to display area determiner 43.

Communicator 41 as an example of a video receiver functions as a communication interface for video image processing device 3, receives wide range video data of the entire celestial sphere ASP transmitted from video image processing device 3, and outputs wide range video data of the entire celestial sphere ASP to video input 42.

Video input 42 functions as an input-output interface for communicator 41 and obtains, as input, wide range video data of the entire celestial sphere ASP received by communicator 41. Video input 42 outputs wide range video data of the entire celestial sphere ASP to segment video image generator 44.

Display area determiner 43 is configured by using a processor such as a CPU, an MPU, or a DSP and determines a predetermined area including the direction of the sight line of the user as a center (that is, a segment area of the video data) from the output of gyro sensor JS (that is, the detected values corresponding to the three axes of roll, pitch, and yaw). Display area determiner 43 outputs segment area information that is a determination result to segment video image generator 44.

Segment video image generator 44 is configured by using a processor such as a CPU, an MPU, or a DSP and generates segment video display data that is obtained by segmenting video data corresponding to the segment area information, which is output from display area determiner 43, from wide range video data of the entire celestial sphere ASP output from video input 42. Segment video image generator 44 outputs the segment video display data to video luminosity adjuster 45.

Segment video image generator 44 uses the luminosity data for each pixel of wide range video data of the entire celestial sphere ASP included in wide range video data of the entire celestial sphere ASP to calculate the average value of the luminosity of video display data in the area of the video image corresponding to the segment video display data (that is, in the segment area corresponding to the segment area information output from display area determiner 43). Segment video image generator 44 outputs segment area average luminosity information that is a calculated value to video luminosity adjuster 45.

Video luminosity adjuster 45 as an example of a luminosity adjuster is configured by using a processor such as a CPU, an MPU, or a DSP and uses the segment video display data and the segment area average luminosity information output from segment video image generator 44 to adjust the segment area average luminosity information in such a manner that the segment area average luminosity information of the segment video display data has a certain range of luminosity. An adjustment process for the segment area average luminosity information in video luminosity adjuster 45 will be described later with reference to FIG. 7B and FIG. 8B. Video luminosity adjuster 45 outputs corrected segment video display data after adjusted to have a certain range of luminosity to video display 46.

Video display 46 is configured by using, for example, a liquid crystal display (LCD) or organic electroluminescence (EL) and displays the segment video data after the luminosity thereof is adjusted by video luminosity adjuster 45.

Figure 5:
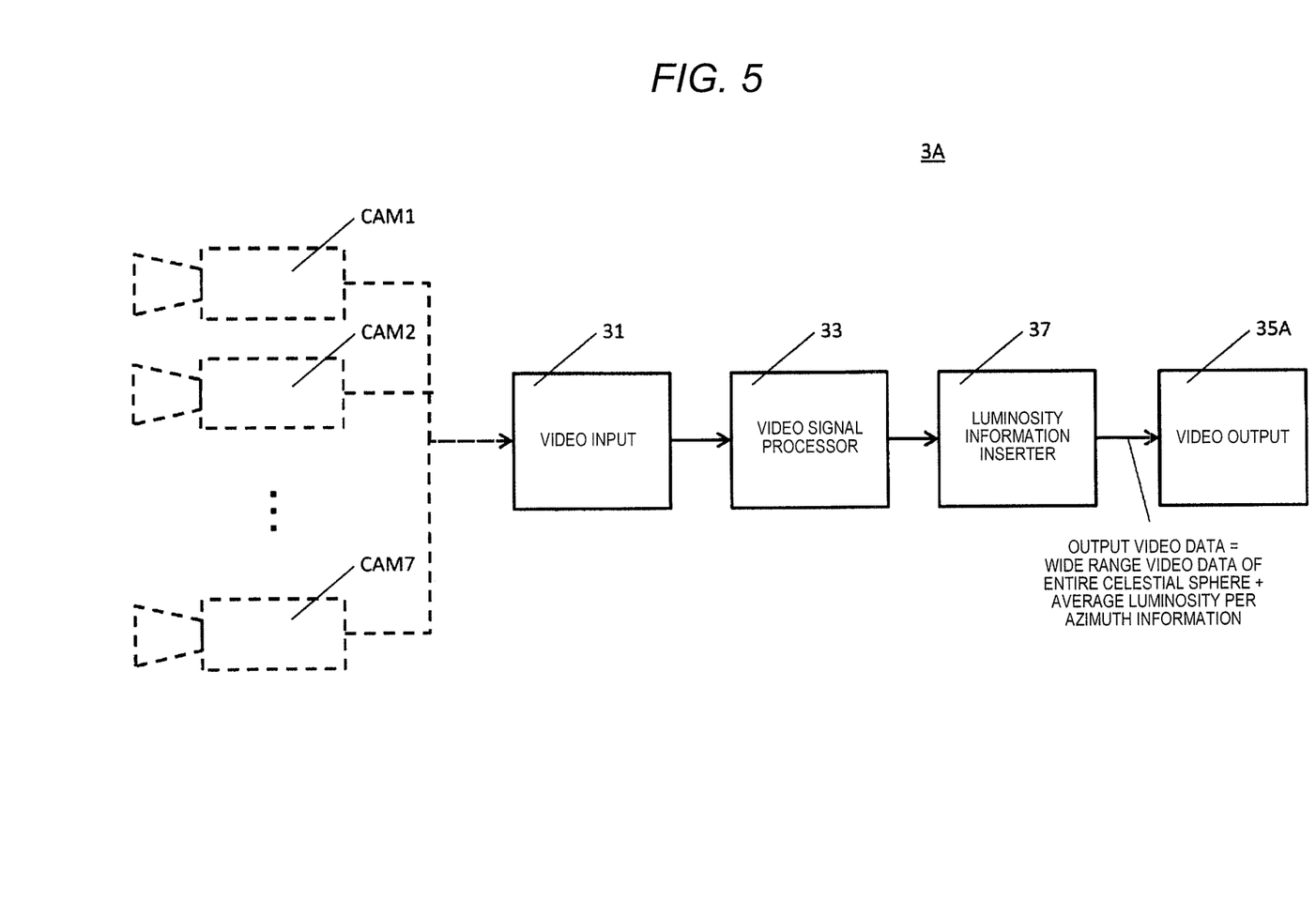
FIG. 5 is a block diagram of a second example of the internal configuration of the video image processing device of the present embodiment.

FIG. 5 is a block diagram illustrating a second example of the internal configuration of the video image processing device of the present embodiment. Video image processing device 3A illustrated in FIG. 5 is configured to include video input 31, video signal processor 33, video output 35A, and luminosity information inserter 37. In FIG. 5 as well, connector CN (refer to FIG. 1) is not illustrated between cameras CAM1 to CAM7 and video input 31. In descriptions of each unit of video image processing device 3A illustrated in FIG. 5, the same configuration and operation as each unit of video image processing device 3 illustrated in FIG. 3 will be designated by the same reference sign and will not be described.

Video signal processor 33 outputs wide range video data of the entire celestial sphere ASP to luminosity information inserter 37.

Luminosity information inserter 37 as an example of a luminosity data inserter calculates the average value of the luminosity of the video data per azimuth using the luminosity data for each pixel of wide range video data of the entire celestial sphere ASP included in wide range video data of the entire celestial sphere ASP output from video signal processor 33. Luminosity information inserter 37 superimposes the value obtained by calculating the average value of the luminosity of the video data per azimuth on wide range video data of the entire celestial sphere ASP. Luminosity information inserter 37, as an example of superimposition, superimposes (inserts) the value obtained by calculating the average value of the luminosity of the video data per azimuth by storing the value in a header region (not illustrated) of wide range video data of the entire celestial sphere ASP or in an option region of a payload. Luminosity information inserter 37 outputs wide range video data of the entire celestial sphere ASP on which the calculated value of the average value of the luminosity of the video data per azimuth is superimposed to video output 35A.

Video output 35A transmits the output of video signal processor 33 (that is, wide range video data of the entire celestial sphere ASP on which the calculated value of the average value of the luminosity of the video data per azimuth is superimposed) to head mounted display 4A through network NW.

Figure 7A:
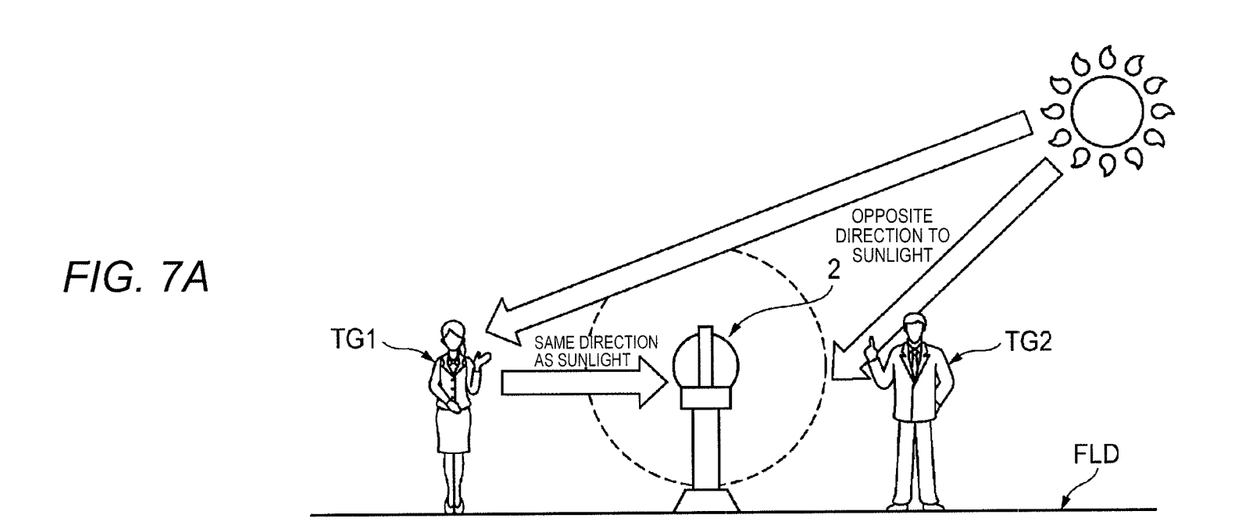
FIG. 7A is a descriptive diagram of an example of a positional relationship between an omnidirectional camera of the present embodiment and a photogenic subject.

A positional relationship between omnidirectional camera 2 and a photogenic subject captured by omnidirectional camera 2 will be described with reference to FIG. 7A. FIG. 7A is a descriptive diagram illustrating an example of a positional relationship between omnidirectional camera 2 of the present embodiment and photogenic subjects TG1 and TG2. In the example illustrated in FIG. 7A, omnidirectional camera 2 is installed to be supported on a support (for example, a stand) disposed on ground FLD in an outdoor environment where sunlight falls. Female photogenic subject TG1 and male photogenic subject TG2 stand around omnidirectional camera 2. If seen from the center of omnidirectional camera 2 (origin O illustrated in FIG. 8A), photogenic subject TG1 stands in the same direction as sunlight (that is, the direction in which the average value of the luminosity of the video data is relatively great), while photogenic subject TG2 stands in the opposite direction to sunlight (that is, the direction in which the average value of the luminosity of the video data is relatively small).

In this case, the luminosity of the video data that is captured by a camera having photogenic subject TG1 in an angle of view thereof is relatively high. Thus, the visibility of the video data may not be good such that the video data is seen as white or not seen due to the excessively high luminosity of the video data. The luminosity of the video data that is captured by a camera having photogenic subject TG2 in an angle of view thereof is relatively low. Thus, the visibility of the video data may not be good such that the video data is excessively dark.

Figure 8A:
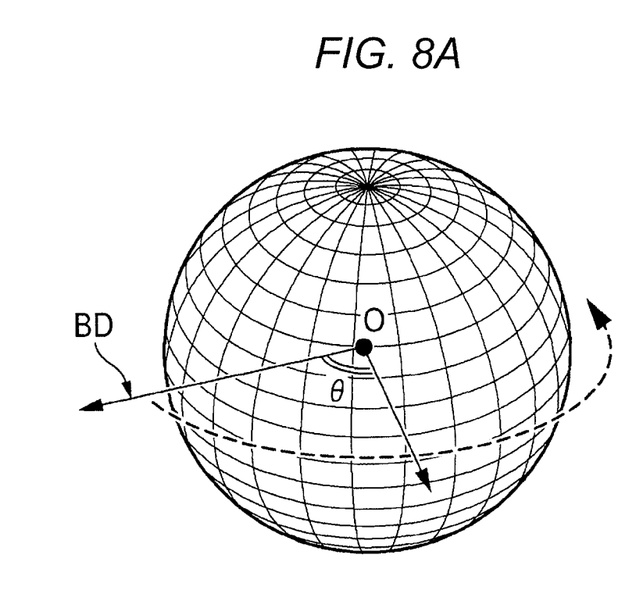
FIG. 8A is a descriptive diagram of the origin of the omnidirectional camera, a reference line of horizontal direction, and a horizontal angle indicating the direction of the sight line of the user.
Figure 8B:
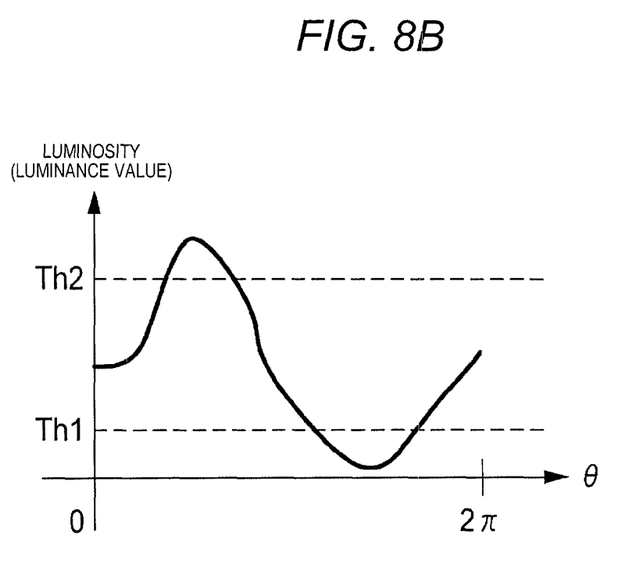
FIG. 8B is a graph of an example of a relationship between the horizontal angle indicating the direction of the sight line of the user and a luminosity (for example, a luminance value)

FIG. 8A is a descriptive diagram of origin O of the omnidirectional camera, reference line of horizontal direction BD, and horizontal angle θ indicating the direction of the sight line of the user. FIG. 8B is a graph illustrating an example of a relationship between horizontal angle θ indicating the direction of the sight line of the user and the luminosity (for example, the luminance value). In FIG. 8A, horizontal angle θ that indicates the direction of the sight line of the user represents a rotational angle in the horizontal direction from reference line of horizontal direction BD that is defined in advance between video image processing device 3 and head mounted display 4.

Luminosity information inserter 37 processes data related to the azimuth angle of each of cameras CAM1 to CAM7 and constituting wide range video data of the entire celestial sphere ASP and uses the data related to the azimuth angle to calculate the luminosity per azimuth for each frame of wide range video data of the entire celestial sphere ASP (refer to FIG. 8B). The horizontal axis of FIG. 8B represents horizontal angle θ, and the vertical axis of FIG. 8B represents the luminosity (for example, the luminance value). In FIG. 8B, threshold Th1 is a threshold for determining whether or not the luminosity per azimuth is excessively low (in other words, excessively dark). If the luminosity per azimuth is smaller than threshold Th1, the video data is said to be excessively dark. Meanwhile, threshold Th2 is a threshold for determining whether or not the luminosity per azimuth is excessively high (in other words, excessively bright). If the luminosity per azimuth is greater than threshold Th2, the video data is said to be excessively bright.

As illustrated in FIG. 8B, in a case, for example, where horizontal angle θ is approximately 90 degrees (approximately π/2), the video data looks excessively bright, and the luminosity exceeds threshold Th2. This is based on the fact that the luminosity of the video data obtained by capturing is high in a case where female photogenic subject TG1 stands in the same direction as sunlight as illustrated in FIG. 7A. Meanwhile, in a case, for example, where horizontal angle θ is approximately 270 degrees (approximately 3 π/2), the video data looks excessively dark, and the luminosity is smaller than threshold Th1. This is based on the fact that the luminosity of the video data obtained by capturing is low in a case where male photogenic subject TG2 stands in the opposite direction to sunlight as illustrated in FIG. 7A.

Figure 7B:
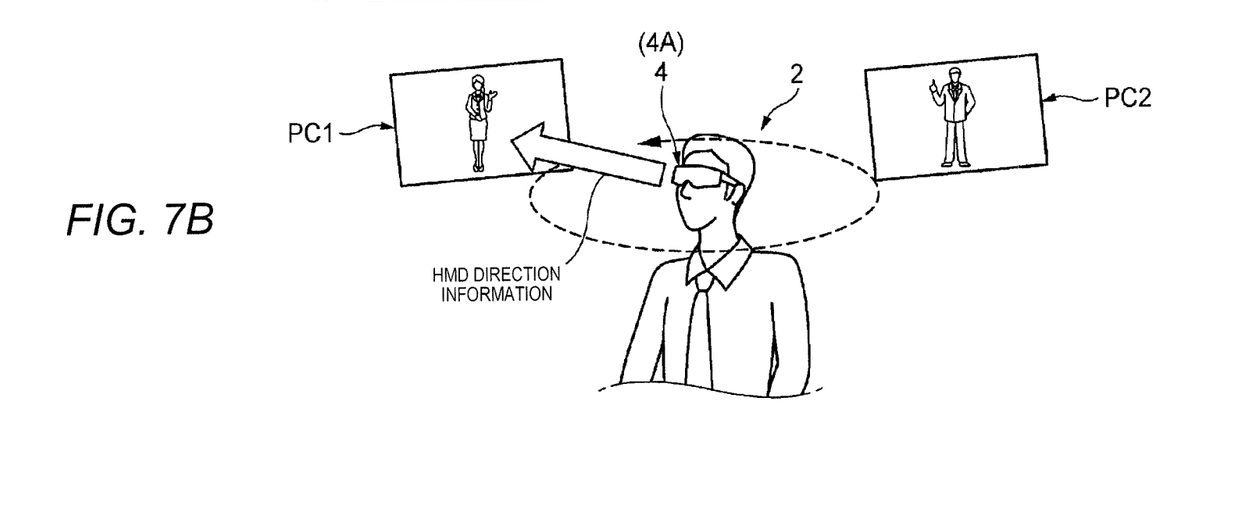
FIG. 7B is a descriptive diagram of an example in which a video image captured in the direction of the sight line of a user is segmented from video data captured by the omnidirectional camera illustrated in FIG. 7A and is displayed in the head mounted display.

Video luminosity adjuster 45 and video luminosity adjuster 45A of head mounted displays 4 and 4A adjust the luminosity of the segment video display data in such a manner that the luminosity of the segment video display data falls in a certain range (for example, a predetermined range from threshold Th1 to threshold Th2 illustrated in FIG. 8B). FIG. 7B is a descriptive diagram illustrating an example in which a video image captured in the direction of the sight line of the user is segmented from the video data captured by omnidirectional camera 2 illustrated in FIG. 7A and is displayed in head mounted display 4. In a state where the user wears head mounted display 4 or 4A, head mounted display 4 or 4A displays corrected segment video display data PC1 that is obtained by adjusting the luminosity of the video data (segment video display data) captured in the direction in which female photogenic subject TG1 stands to be darker and to fall in a certain range of luminosity. Head mounted display 4 or 4A displays corrected segment video display data PC2 that is obtained by adjusting the luminosity of the video data (segment video display data) captured in the direction in which male photogenic subject TG2 stands to be brighter and to fall in a certain range of luminosity.

Video luminosity adjuster 45 and video luminosity adjuster 45A of head mounted displays 4 and 4A may adjust the luminosity of the segment video display data by increasing or decreasing the luminosity by a predetermined percentage, instead of adjusting the luminosity of the segment video display data to fall in a certain range of luminosity, and the same applies hereinafter. The predetermined percentage is, for example, +20% or −20%, though not limited to these values.

Figure 6:
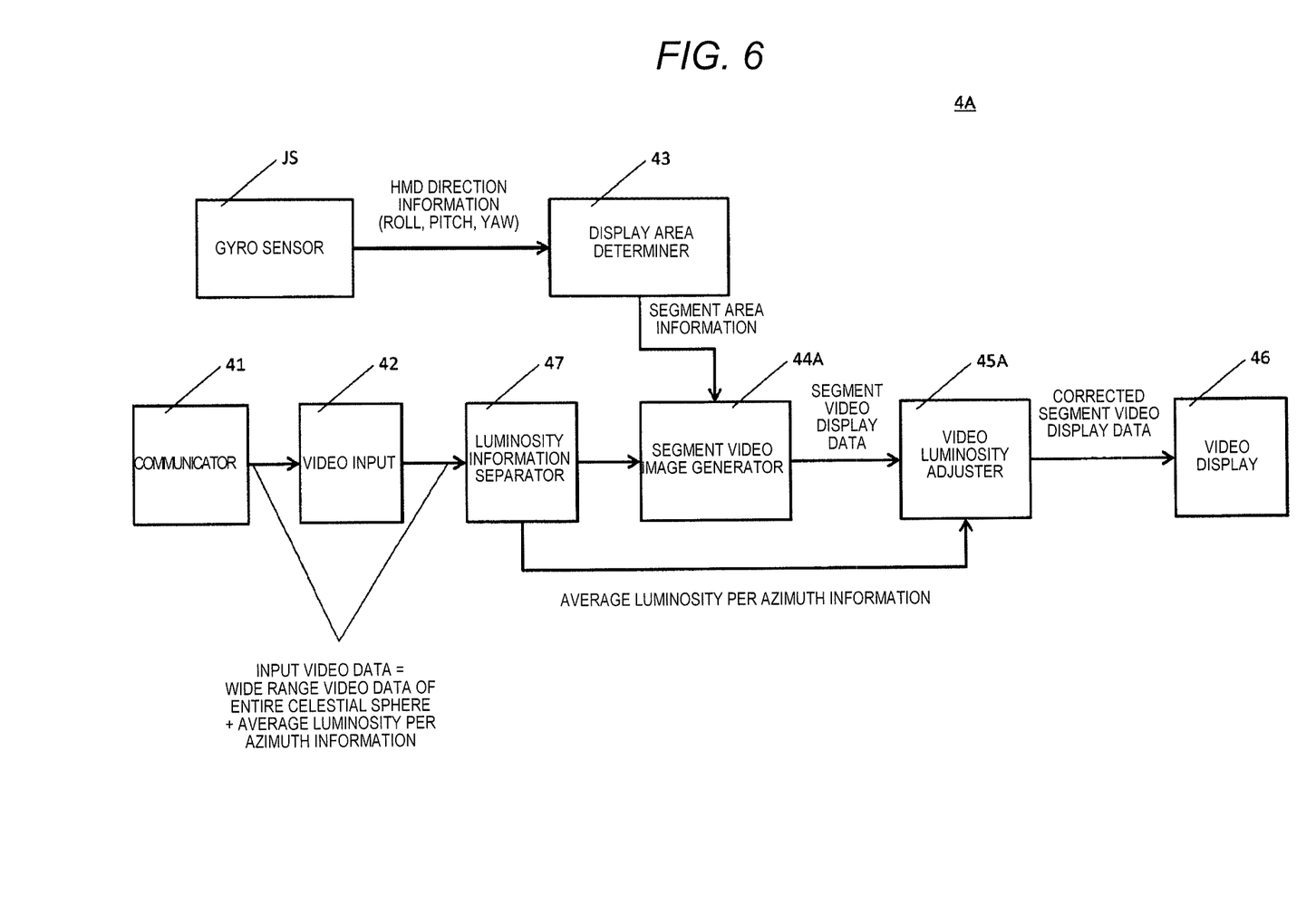
FIG. 6 is a block diagram of a second example of the internal configuration of the head mounted display of the present embodiment.

FIG. 6 is a block diagram illustrating a second example of the internal configuration of the head mounted display of the present embodiment. Head mounted display 4A illustrated in FIG. 6 is configured to include gyro sensor JS, communicator 41, video input 42, display area determiner 43, segment video image generator 44A, video luminosity adjuster 45A, video display 46, and luminosity information separator 47. In descriptions of each unit of head mounted display 4A illustrated in FIG. 6, the same configuration and operation as each unit of head mounted display 4 illustrated in FIG. 4 will be designated by the same reference sign and will not be described. Head mounted display 4A receives wide range video data of the entire celestial sphere ASP on which the calculated value of the average value of the luminosity of the video data per azimuth is superimposed.

Video input 42 outputs wide range video data of the entire celestial sphere ASP on which the calculated value of the average value of the luminosity of the video data per azimuth is superimposed to luminosity information separator 47.

Luminosity information separator 47 separates the calculated value of the average value of the luminosity of the video data per azimuth (in other words, average luminosity per azimuth information) from wide range video data of the entire celestial sphere ASP on which the calculated value of the average value of the luminosity of the video data per azimuth is superimposed and outputs the separated value to video luminosity adjuster 45A. Luminosity information separator 47 outputs wide range video data of the entire celestial sphere ASP from which the calculated value of the average value of the luminosity of the video data per azimuth is separated to segment video image generator 44A.

Segment video image generator 44A as an example of a video image extractor is configured by using a processor such as a CPU, an MPU, or a DSP and generates the segment video display data that is obtained by segmenting video data corresponding to the segment area information, which is output from display area determiner 43, from wide range video data of the entire celestial sphere ASP output from luminosity information separator 47. Segment video image generator 44A outputs the segment video display data to video luminosity adjuster 45A.

Video luminosity adjuster 45A as an example of a luminosity adjuster is configured by using a processor such as a CPU, an MPU, or a DSP and uses the segment video display data output from segment video image generator 44A and the average luminosity per azimuth information output from luminosity information separator 47 to adjust the segment area average luminosity information in such a manner that the average luminosity information of the segment video display data has a certain range of luminosity. Video luminosity adjuster 45A outputs the corrected segment video display data after adjusted to have a certain range of luminosity to video display 46.

Figure 9:
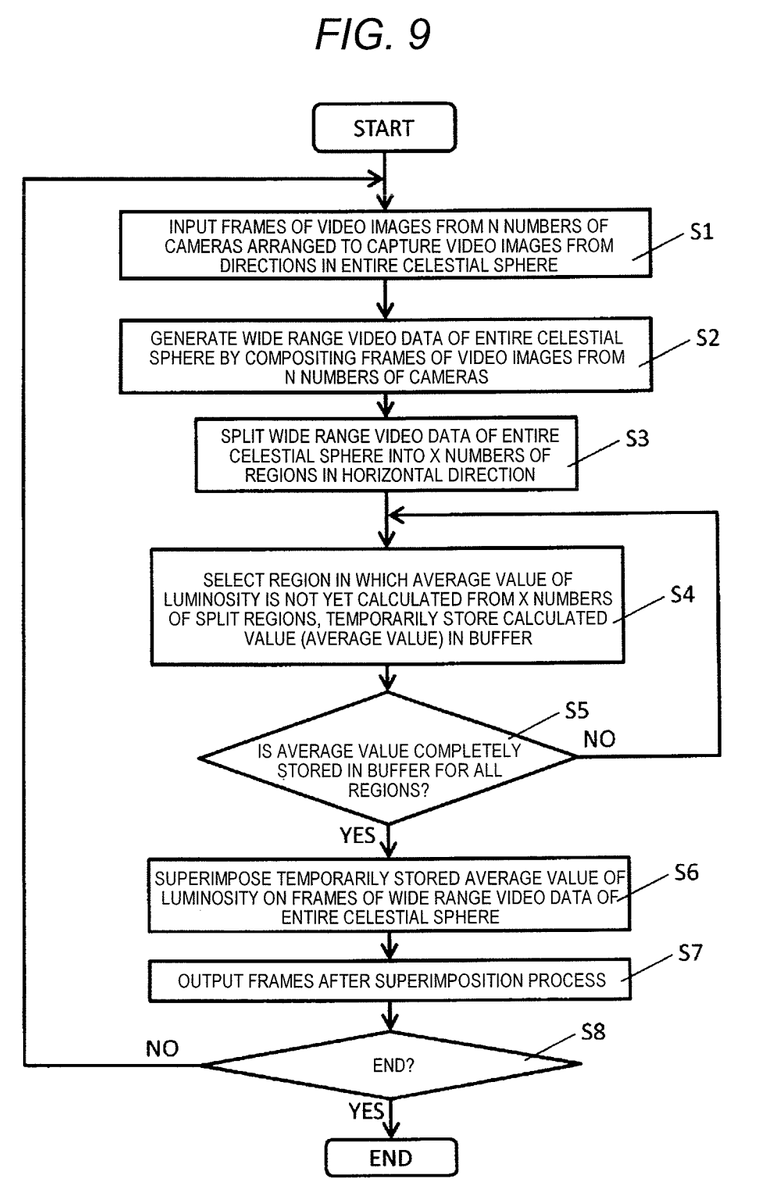
FIG. 9 is a flowchart of an example of an operating procedure of the video image processing device of the present embodiment.

Next, an operating procedure of video image processing device 3A of the present embodiment will be described with reference to FIG. 9. FIG. 9 is a flowchart illustrating an example of the operating procedure of video image processing device 3A of the present embodiment.

In FIG. 9, video input 31 obtains, as input, video data that is output from N numbers (for example, N=7 in the present embodiment) of cameras CAM1 to CAM7 arranged to capture video images from directions in the entire celestial sphere (S1). Video input 31 outputs the video data from each of cameras CAM1 to CAM7 to video signal processor 33.

Video signal processor 33 uses the video data which is the image data captured by cameras CAM1 to CAM7 and output from video input 31 to generate wide range video data of the entire celestial sphere ASP illustrated in FIG. 2 by performing the stitching process for each frame of the video data (S2). Video signal processor 33 outputs wide range video data of the entire celestial sphere ASP to luminosity information inserter 37. Luminosity information inserter 37 performs a process of splitting wide range video data of the entire celestial sphere ASP into X numbers of regions in the horizontal direction (S3). The value of X is, for example, 32 or 64, though not limited to these values.

Luminosity information inserter 37 selects a region in which the average value of the luminosity is not yet calculated from the X numbers of split regions, calculates the average value of the luminosity of the video data in the selected region, and temporarily stores the calculated value (that is, the average value) in a buffer (not illustrated) (S4).

Luminosity information inserter 37 determines whether or not the average value of the luminosity of the video data is completely calculated for all of the X numbers of regions and is temporarily stored in the buffer (S5). In a case where the calculated value of the average value of the luminosity of the video data is not stored in the buffer for all of the X numbers of regions (NO in S5), the process of video image processing device 3A returns to Step S4, and the process of Step S4 is repeated until the calculated value of the average value of the luminosity of the video data is stored in the buffer for all of the X numbers of regions.

Meanwhile, luminosity information inserter 37, in a case where the calculated value of the average value of the luminosity of the video data is stored in the buffer for all of the X numbers of regions (YES in S5), superimposes the calculated value of the average value of the luminosity of the video data stored in the buffer for all of the X numbers of regions on wide range video data of the entire celestial sphere ASP (S6). Luminosity information inserter 37 outputs the frames of wide range video data of the entire celestial sphere ASP on which the calculated value of the average value of the luminosity of the video data per azimuth is superimposed to video output 35A (S7). Video output 35A transmits the output of video signal processor 33 (that is, wide range video data of the entire celestial sphere ASP on which the calculated value of the average value of the luminosity of the video data per azimuth is superimposed) to head mounted display 4A through network NW. After Step S7, the process of video image processing device 3A returns to Step S1 if the operation of video image processing device 3A is not ended (NO in S8). Meanwhile, if the operation of video image processing device 3A is ended (YES in S8), the process of video image processing device 3A illustrated in FIG. 9 is ended.

Figure 10:
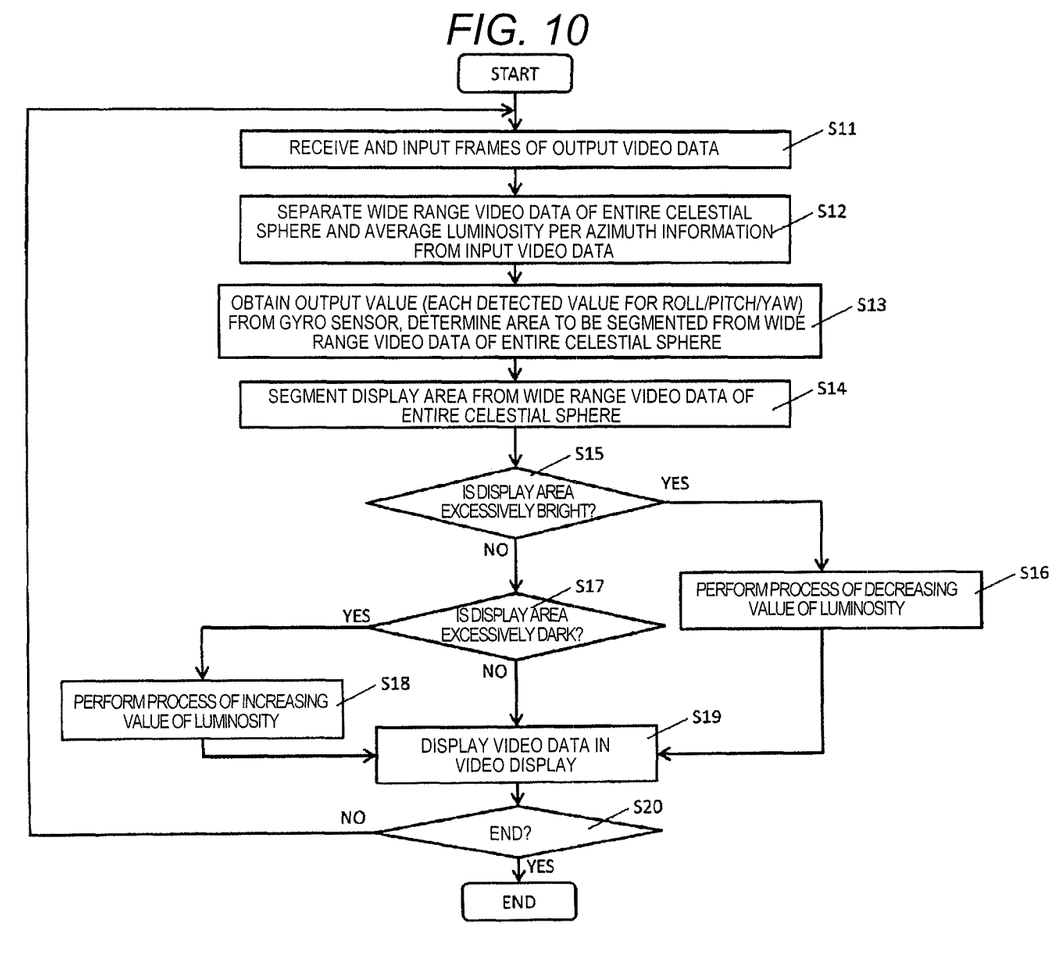
FIG. 10 is a flowchart of an example of an operating procedure of the head mounted display of the present embodiment.

Next, an operating procedure of head mounted display 4A of the present embodiment will be described with reference to FIG. 10. FIG. 10 is a flowchart illustrating an example of the operating procedure of head mounted display 4A of the present embodiment. As an assumption of a description of FIG. 10, wide range video data of the entire celestial sphere ASP on which the calculated value of the average value of the luminosity of the video data per azimuth is superimposed is transmitted from video image processing device 3A.

In FIG. 10, communicator 41 receives wide range video data of the entire celestial sphere ASP (that is, wide range video data of the entire celestial sphere ASP on which the calculated value of the average value of the luminosity of the video data per azimuth is superimposed) transmitted from video image processing device 3A and outputs wide range video data of the entire celestial sphere ASP to video input 42. Video input 42 obtains, as input, wide range video data of the entire celestial sphere ASP received by communicator 41. Video input 42 outputs wide range video data of the entire celestial sphere ASP on which the calculated value of the average value of the luminosity of the video data per azimuth is superimposed to luminosity information separator 47 (S11).

Luminosity information separator 47 separates the calculated value of the average value of the luminosity of the video data per azimuth (in other words, the average luminosity per azimuth information) from wide range video data of the entire celestial sphere ASP on which the calculated value of the average value of the luminosity of the video data per azimuth is superimposed and outputs the separated value to video luminosity adjuster 45A (S12). Luminosity information separator 47 outputs wide range video data of the entire celestial sphere ASP from which the calculated value of the average value of the luminosity of the video data per azimuth is separated to segment video image generator 44A.

Display area determiner 43 determines a predetermined area including the direction of the sight line of the user as a center (that is, a segment area of the video data) from the output of gyro sensor JS (that is, the detected values corresponding to the three axes of roll, pitch, and yaw) (S13). Display area determiner 43 outputs the segment area information that is a determination result to segment video image generator 44A.

Segment video image generator 44A generates the segment video display data that is obtained by segmenting video data corresponding to the segment area information, which is output from display area determiner 43, from wide range video data of the entire celestial sphere ASP output from luminosity information separator 47 (S14). Segment video image generator 44A outputs the segment video display data to video luminosity adjuster 45A.

Video luminosity adjuster 45A determines whether or not the luminosity of the video data in the segment area of the video data determined in Step S13 is excessively high (S15). Video luminosity adjuster 45A, in a case where the luminosity of the video data in the segment area of the video data is determined to be excessively high (for example, in a case where the luminosity of the video data in the segment area of the video data exceeds threshold Th2) (YES in S15), adjusts the segment area average luminosity information to have a lower luminosity in such a manner that the average luminosity information of the segment video display data has a certain range of luminosity (S16). Video luminosity adjuster 45A outputs the corrected segment video display data after adjusted to have a certain range of luminosity to video display 46. After Step S16, the process of head mounted display 4A proceeds to Step S19.

Meanwhile, in a case where the luminosity of the video data in the segment area of the video data determined in Step S13 is determined not to be excessively high (NO in S15), video luminosity adjuster 45A determines whether or not the luminosity of the video data in the segment area of the video data determined in Step S13 is excessively low (S17). Video luminosity adjuster 45A, in a case where the luminosity of the video data in the segment area of the video data is determined to be excessively low (for example, in a case where the luminosity of the video data in the segment area of the video data is smaller than threshold Th1) (YES in S17), adjusts the segment area average luminosity information to have a high luminosity in such a manner that the average luminosity information of the segment video display data has a certain range of luminosity (S18). Video luminosity adjuster 45A outputs the corrected segment video display data after adjusted to have a certain range of luminosity to video display 46. After Step S18, the process of head mounted display 4A proceeds to Step S19.

After the processes of Steps S16 and S18 or in a case where the luminosity of the video data in the segment area of the video data is determined not to be excessively low (NO in S17), video display 46 displays the segment video data after the luminosity thereof is adjusted by video luminosity adjuster 45A (S19). After Step S19, the process of head mounted display 4A returns to Step S11 if the operation of head mounted display 4A is not ended (NO in S20). Meanwhile, if the operation of head mounted display 4A is ended (YES in S20), the process of head mounted display 4A illustrated in FIG. 10 is ended.

According to the descriptions heretofore provided, in omnidirectional camera system 1 of the present embodiment, video image processing device 3 uses a plurality of video data captured by the plurality of cameras CAM1 to CAM7 to generate a wide range video data of the entire celestial sphere having a 360-degree range around the area where the plurality of cameras CAM1 to CAM7 is installed and to transmit the wide range video data of the entire celestial sphere to head mounted display 4 that the user wears. Head mounted display 4 detects the direction of the sight line of the user using gyro sensor JS, segments a predetermined area of video data including the detection result of gyro sensor JS from the wide range video data of the entire celestial sphere obtained by reception, and adjusts the luminosity of the segmented predetermined area of video data to fall in a certain range of luminosity. In addition, head mounted display 4 displays the predetermined area of video data after adjusted.

Accordingly, when the user sees the wide range video data of the entire celestial sphere in a state wearing head mounted display 4, head mounted display 4 segments video data that corresponds to the direction of the sight line of the user from the wide range video data of the entire celestial sphere in accordance with the direction of the sight line of the user (that is, the direction of the video display surface in head mounted display 4) and dynamically adjusts the luminosity of the video data after segmented. Therefore, head mounted display 4 can increase the dynamic range of at least one of cameras CAM1 to CAM7 upon capturing in a pseudo manner without a need to illuminate video data using an auxiliary backlight as in Japanese Patent Unexamined Publication No. 7-294876, and thus, the visibility of a video image in the direction of the sight line of the user can be improved.

Head mounted display 4 calculates the average value of the luminosity (for example, the luminance value) of the predetermined area of video data after segmented in accordance with the direction of the sight line of the user and adjusts the average value of the luminosity after calculated to fall in a certain range of luminosity. Accordingly, head mounted display 4 may calculate the average value of the luminosity only for the predetermined area of video data corresponding to the direction of the sight line of the user without a need to calculate the average value of the luminosity of the video data in all regions (that is, the 360-degree range) of the wide range video data of the entire celestial sphere transmitted from video image processing device 3, and thus, load on a calculation process for the average value can be reduced.

Video image processing device 3 calculates data of the average value of the luminosity of the wide range video data of the entire celestial sphere per azimuth and inserts the data into the wide range video data of the entire celestial sphere and transmits the wide range video data of the entire celestial sphere into which the data of the average value of the luminosity per azimuth is inserted to head mounted display 4. Head mounted display 4 obtains the average value of the luminosity of the predetermined area of video data corresponding to the direction of the sight line of the user from the wide range video data of the entire celestial sphere after received and adjusts the average value of the luminosity after obtained to fall in a certain range of luminosity. Accordingly, since the data of the average value of the luminosity per azimuth in the 360-degree range is obtained, head mounted display 4, when, for example, displaying video data by changing the predetermined area corresponding to the direction of the sight line of the user to any area, can appropriately adjust the luminosity of display target video data in correspondence with the average value of the luminosity of any area of video data after changed.

Head mounted display 4, each time, for example, the user rotating a head thereof switches the direction of the sight line of the user, adjusts the luminosity of the predetermined area of video data segmented in accordance with the detection result of gyro sensor JS to fall in a certain range of luminosity and displays the predetermined area of video data after adjusted. Accordingly, head mounted display 4, even if the user switches the direction of view, can suppress degradation of the visibility of video data that is displayed by following the luminosity of the predetermined area of video data, which corresponds to the direction of head mounted display 4 (that is, the direction of the sight line of the user), being adjusted to fall in a certain range.

While various embodiments have been heretofore described with reference to the drawings, it is needless to say that the present disclosure is not limited to such examples. It is apparent that those skilled in the art may perceive various modification examples and correction examples within the scope disclosed in the claims, and those examples are obviously understood to fall within the technical scope of the present disclosure.

What is claimed is:

1. A video display system, comprising:
   a video image processing device that retains a plurality of video data captured by a plurality of cameras and is connected to the video display system; and
   a video display device that is wearable by a user and is connected to the video display system,
   wherein the video image processing device:
      performs a stitching process for each frame that composites the plurality of video data to generate 360- degree wide range video data of a 360-degree range around an area where the plurality of cameras is located; and transmits the 360-degree wide range video data, for each frame, to the video display device, and the video display device:

detects, via a sensor, a direction of a sight line of the user;

receives the 360-degree wide range video data, for each frame, transmitted from the video transmitter;

segments a partial area of video data that is a part of the 360-degree wide range video data and includes a detection result of the sensor from the 360-degree wide range video data;

calculates an average value of a luminosity of the partial area of video data without calculating an average value of a luminosity of the 360degree wide range video data;

in a case that the average value of the luminosity of the partial area of video data exceeds or is less than a certain range of luminosity:

adjusts the luminosity of the partial area of video data so that the average value of the luminosity of the partial area of video data is in the certain range of luminosity; and displays, via a video display, the partial area of video data after adjusting the luminosity; and in a case that the average value of the luminosity of the partial area of video data does not exceed and is not less than the certain range of luminosity:

displays, via the video display, the partial area of video data without adjusting the luminosity.

2. The video display system of claim 1, wherein the video display device, each time the direction of the sight line of the user is switched, in the case that the average value of the luminosity of the partial area of video data exceeds or is less than the certain range of luminosity, adjusts the luminosity of the partial area of video data, segmented in accordance with the detection result of the sensor, so that the average value of the luminosity of the partial area of video data is in the certain range of luminosity and displays the partial area of video data after adjusting of the luminosity.

3. A video display device wearable by a user and connected with a video image processing device that retains a plurality of video data captured by a plurality of cameras, the video display device comprising:

a sensor that detects a direction of a sight line of the user;

a receiver that receives 360-degree wide range video data of a 360-degree range around an area where the plurality of cameras is located, the 360-degree wide range video data being generated by the video image processing device;

a processor that segments a partial area of video data that is a part of the 360-degree wide range video data and includes a detection result of the sensor from the 360-degree wide range video data;

the processor that calculates an average value of a luminosity of the partial area of video data without calculating an average value of a luminosity of the 360-degree wide range video data;

in a case that the average value of the luminosity of the partial area of video data exceeds or is less than a certain range of luminosity:

the processor that adjusts the luminosity of the partial area of video data so that the average value of the luminosity of the partial area of video data is in the certain range of luminosity; and a display that displays the partial area of video data after adjusting the luminosity by the processor; and in a case that the average value of the luminosity of the partial area of video data does not exceed and is not less than the certain range of luminosity:

the display that displays the partial area of video data without adjusting the luminosity.

4. A video display method for a video display device wearable by a user and connected with a video image processing device that retains a plurality of video data captured by a plurality of cameras, the video display method comprising:

detecting a direction of a sight line of the user;

receiving 360-degree wide range video data of a 360-degree range around an area where the plurality of cameras is located, the 360-degree wide range video data being generated by the video image processing device;

segmenting a partial area of video data that is a part of the 360-degree wide range video data and includes the detected direction of the sight line of the user from the 360-degree wide range video data;

calculating an average value of a luminosity of the partial area of video data without calculating an average value of a luminosity of the 360-degree wide range video data;

in a case that the average value of the luminosity of the partial area of video data exceeds or is less than a certain range of luminosity:

adjusting, by a processor, the luminosity of the partial area of video data so that the average value of the luminosity of the partial area of video data is in the certain range of luminosity; and displaying, on a display, the partial area of video data after the adjusting of the luminosity; and in a case that the average value of the luminosity of the partial area of video data does not exceed and is not less than the certain range of luminosity:

displaying, on the display, the partial area of video data without adjusting the luminosity.

5. The video display method of claim 4, wherein, each time the direction of the sight line of the user is switched, in the case that the average value of the luminosity of the partial area of video data exceeds or is less than the certain range of luminosity, the luminosity of the partial area of video data, segmented in accordance with the detection result of the sensor, is adjusted so that the average value of the luminosity of the partial area of video data is in the certain range of luminosity, and the partial area of video data is displayed after adjusting of the luminosity.

* * * * *